Sept. 2, 1941.    C. E. STAINBROOK    2,254,759
METHOD OF CUTTING AND BAKING ROLLS
Filed Aug. 12, 1939    4 Sheets-Sheet 1
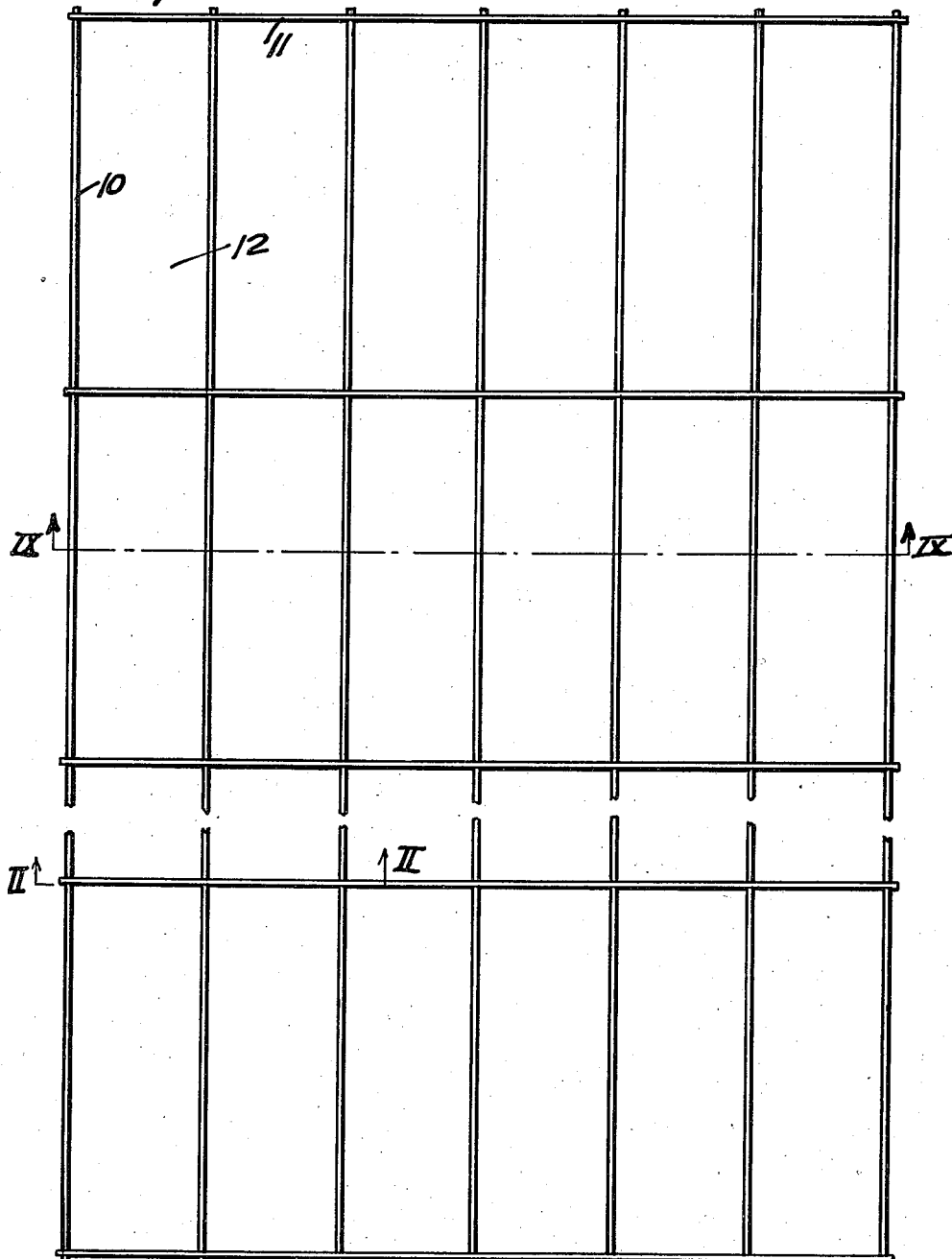
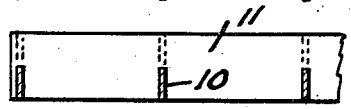
INVENTOR
CLYDE E. STAINBROOK Sept. 2, 1941.    C. E. STAINBROOK    2,254,759
METHOD OF CUTTING AND BAKING ROLLS
Filed Aug. 12, 1939    4 Sheets-Sheet 2
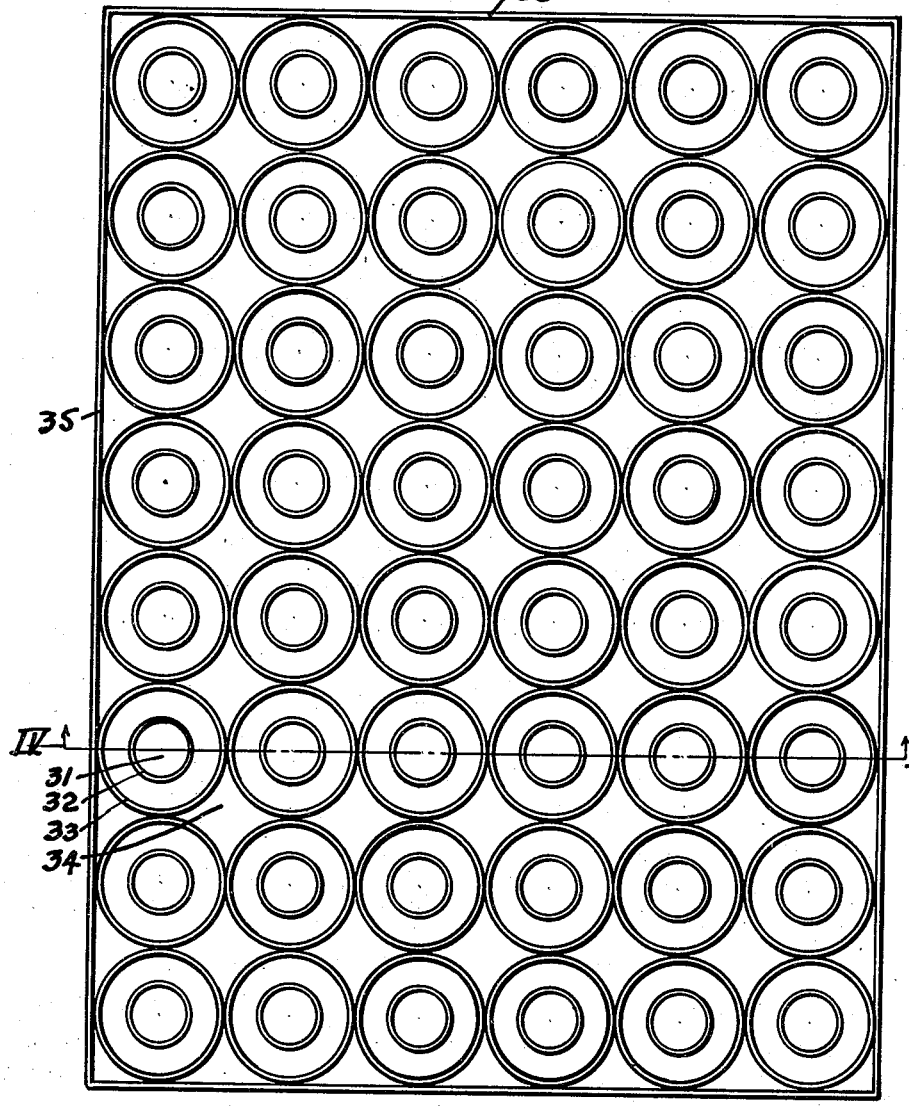
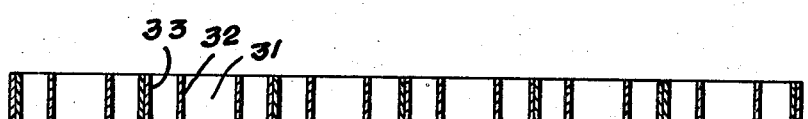
INVENTOR
CLYDE E. STAINBROOK
by J. H. Weatherford
atty.

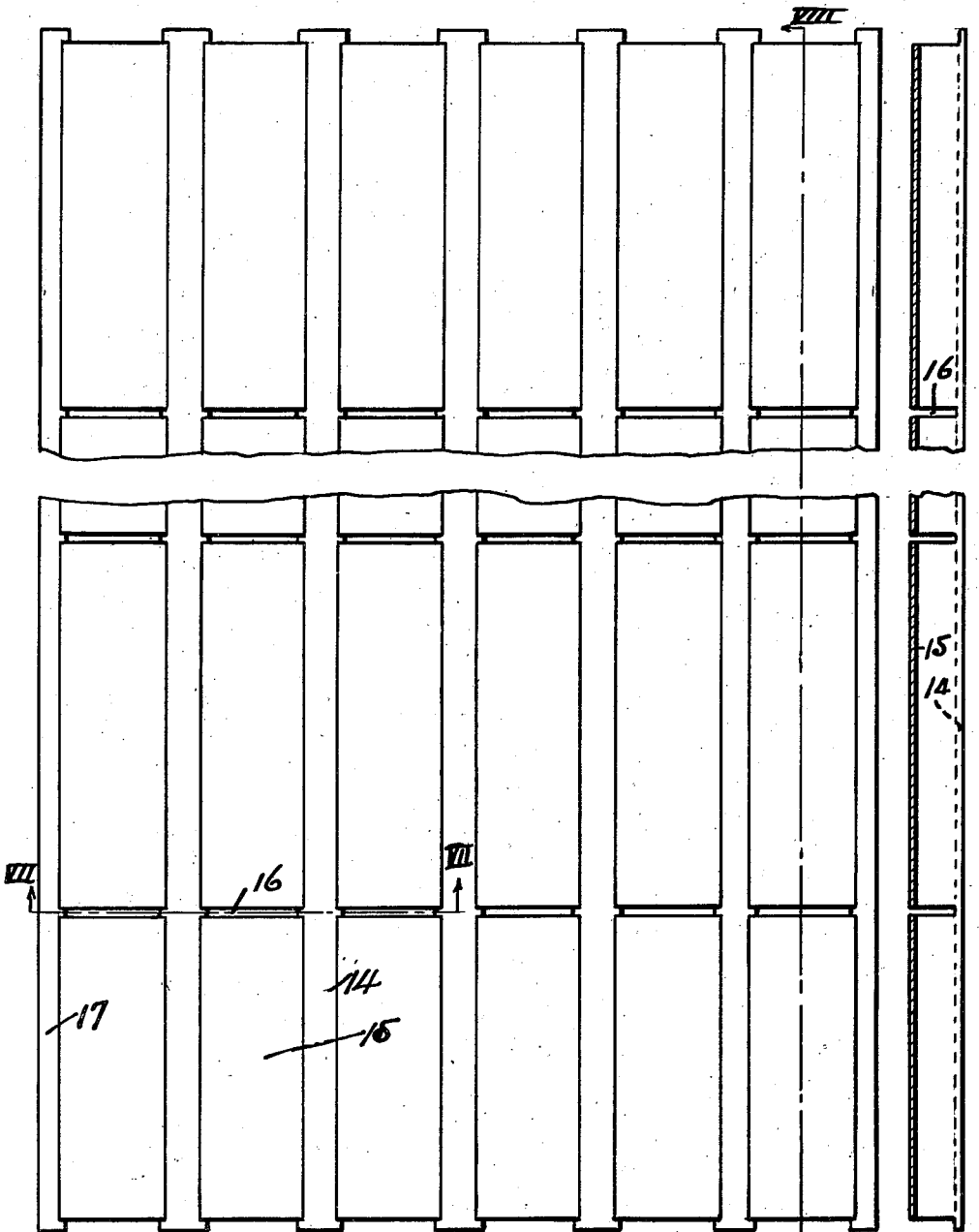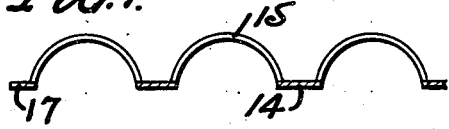

Sept. 2, 1941.  C. E. STAINBROOK  2,254,759
METHOD OF CUTTING AND BAKING ROLLS
Filed Aug. 12, 1939  4 Sheets-Sheet 4

INVENTOR
Clyde E. Stainbrook
By J. H. Weatherford
Atty.

Patented Sept. 2, 1941

2,254,759

UNITED STATES PATENT OFFICE 2,254,759

METHOD OF CUTTING AND BAKING ROLLS

Clyde E. Stainbrook, Memphis, Tenn.

Application August 12, 1939, Serial No. 289,715

2 Claims. (Cl. 107—54)

This invention relates to improvements in a method of cutting dough, as for baking into rolls or other definite shapes, and to a method of subsequently baking them.

The usual preparation of dough for baking, includes rolling the dough to proper thickness and the cutting of the dough after rolling into such shape, or cutting from the dough units of such shape as are desired and as will accomplish, after baking, the desired configuration of the article, the units being ordinarily cut one by one and separately placed into the baking pan.

The objects of the present invention are:

To provide a method for handling the cutters relatively to the dough and the dough relatively to the cutters in accomplishing such coordinated cutting.

To provide a method including the above noted steps, for placing the group of units thus cut in properly related position for group baking; and To provide a method for accomplishing the baking of the units of the group in predetermined cross sectional form, and for controlling the browning of the bottom crust of the units.

The means by which the foregoing and other objects are accomplished and the method of their accomplishment will readily be understood from the following specification on reference to the accompanying drawings, in which:

Fig. 1 is a plan view of a cutter adapted for use in cutting rectangular units.

Fig. 2 is a sectional elevation on the line II—II of Fig. 1.

Fig. 3 is a plan view of the cutter adapted for cutting annular units.

Fig. 4 is a sectional elevation of the cutter shown in Fig. 3 taken as on the line IV—IV of that figure.

Fig. 5 is a corresponding fragmentary view showing a modified construction.

Fig. 6 is a plan view of a removable false bottom for a baking pan, which bottom is adapted for use in connection with an ordinary rectangular baking pan for baking the group of units cut with the aid of the cutter shown in Fig. 1.

Fig. 7 is a sectional elevation taken as on the line VII—VII of Fig. 6; and

Fig. 8 a sectional elevation taken as on the line VIII—VIII of Fig. 6.

Figure 9:
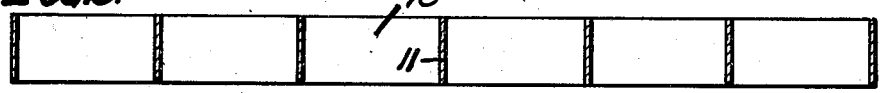

Fig. 9 is a transverse sectional elevation taken as on the line IX—IX of Fig. 1.

Figure 10:
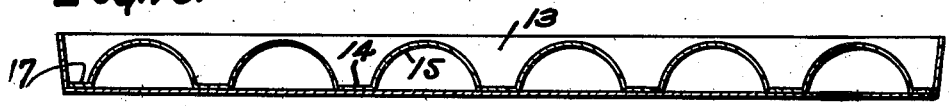

Fig. 10 is a sectional elevation conforming to Fig. 7 showing the false pan bottom in position in the baking pan.

Figure 11:

Fig. 11 is a similar sectional elevation showing the pan, false bottom and cutter assembled.

Figure 12:
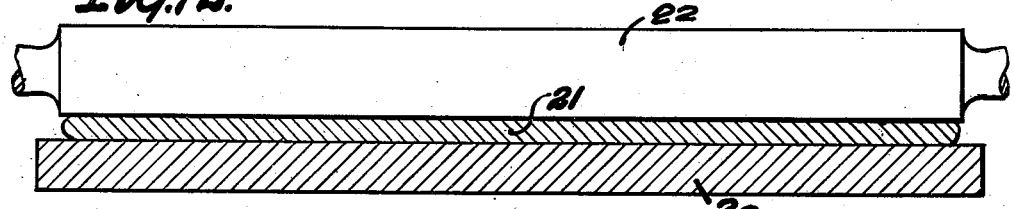

Fig. 12 is a transverse section of a dough board with a sheet of dough rolled out thereon as by the use of a rolling pin.

Figure 13:
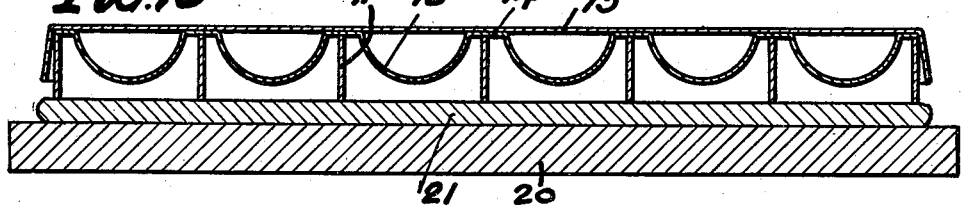

Fig. 13 is a sectional elevation showing the pan and cutter assembly of Fig. 11 inverted over the board and dough assembly of Fig. 12.

Figure 14:
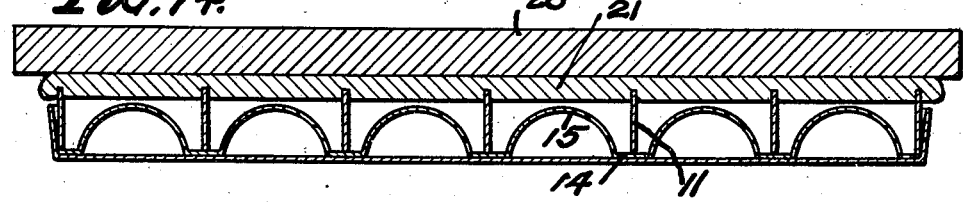
Figure 15:
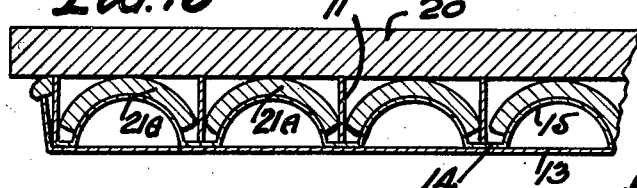

Fig. 14 shows the same assembly re-inverted with the board being forced down to begin cutting; and Fig. 15 the same position of the various parts at the completion of the cutting operation and showing the position assumed by the dough after it has been cut into units.

Referring now to the drawings in which the various parts are indicated by numerals:

10 and 11 are a plurality of strips of thin metal which are positioned in respective longitudinal and transverse relation and secured together as by notching the upper half of the strips 10 and similarly notching the lower half of the strips 11 to receive respectively the un-notched upper half of the bars 11 and the un-notched lower half of the bars 10. The bars may be secured together merely by frictional engagement, or as by welding, and when thus assembled from a plurality of equal sized rectangular compartments 12. The width of the strips is much greater than the thickness of the dough to be cut, and at least slightly greater than the depth of the pan 13 with which they are to be used, and the cutter formed has no bottom or top.

Usually a sufficient number of the longitudinal and transverse strips are provided to form two dozen compartments 12. The baking pan 13 is of ordinary type and of breadth and length to loosely receive the cutter, the depth of the pan being less than the depth of the cutter. Removably disposed within the pan is a false bottom which comprises alternate relatively narrow flat portions 14, adapted to lie on the bottom of the pan and extending uninterruptedly from end to end thereof, which strips are joined by wider arched portions 15, preferably of substantially semi-circular cross section, these arched and flat portions preferably being integrally formed from a flat sheet of thin metal. The arched portions 15 are interrupted by transverse slots 16, which slots extend to the level of the top of the flat portions 14 and are spaced to conform to and receive the transverse strips 11 of the cutter. The center to center spacing of the arched portions 15 of the false bottom is identical with the spacing of the longitudinal strips 10 and their transverse width is substantially less than their spacing to establish a width for the flat portions 14, between the arched portions, sufficient to allow for the expansion due to rising of the dough.

17 are flat edge portions extending along the side edges of the laterally outer arched portions 15, these side portions being of somewhat more than half the width of the flat portions and serving to center the false bottom laterally with regard to the baking pan, as well as to allow for roll expansion. 20 is a board, 21 a sheet of dough rolled out thereon, and 22 a rolling pin through which flattening and spreading of the dough is accomplished. 21—A are sections or roll units of the dough after cutting, as these sections have conformed themselves to the shape of the arched portions 15 of the false bottom.

In Figs. 3 and 4 a cutter is shown for articles of annular form such as doughnuts. This cutter comprises a base 30 having lateral and transverse rows of circular openings 31 therethrough, around which openings are centered cylindrical cutters 32, which cutters are of considerably greater depth than the thickness of the dough which is to be cut. These cutters are adapted to cut the central holes of the doughnuts. Concentric with these cutters are additional cylindrical cutters 33, which cut the outside of the doughnuts, these cutters also being seated on and together with the inner cutters being integrally secured to the base 30. The outside cutters are so positioned that their exterior surfaces contact both with the like surfaces of the laterally and longitudinally adjacent cutters along vertical lines. The base is also cut away exterior to the outside cutters to leave fully open passage between the bottoms thereof. The cutters 33, where they abut the adjacent cutters, are secured together as by welding.

The above described structure may also be constructed by forming annular cups having an annular bottom 30 and concentric cylindrical sides 32 and 33 conforming respectively in interior and exterior diameters to the interior and exterior diameters of the annular bottom, and preferably being formed integral therewith, as by the usual well known method of stamping, these cups being assembled in lateral and longitudinal rows to form assemblies ordinarily of four dozen cups and having their contacting edges rigidly secured together as by welding to form a unitary structure with central openings 31 through the cups and openings 34 adjacent the exterior of the cups. If desired, longitudinal and lateral strips 35, 36 respectively may extend along the sides and ends of the outer rows of cups and be joined to them along vertical contacting edges of the cups to additionally stiffen the structure.

In using the device, the dough for rolls or the like is rolled out on the flat board 20, in usual or desired manner, and of that uniform thickness which is necessary to give after rising the desired thickness of the rolls. After being thus rolled out, as shown in Fig. 12, the cutter assembly is placed thereon. The false bottom 14—15 is inverted and placed on this cutter assembly and the inverted pan 13 placed thereover. The entire grouping is then inverted, as shown in Fig. 14, and pressure exerted on the board 20 to force the dough 21 against the edges of the cutter strips 10 and 11 and through these strips to separate the sheet of dough into rectangular sections, or the board may be removed and the dough rolled into cutting relation. As this cutting is completed the rectangular sections 21—A drop down on the arched portions 15 of the false bottom and conform in curvature thereto as shown in Fig. 15. The board 20, and the cutter assembly are removed, the dough is allowed to rise, and subsequently the pan is placed in the oven and the rolls baked. After baking the rolls conform in cross section to the arches of the false bottom, and by virtue of the arching of the false bottom, the browning of the underside or bottom of the rolls during baking is minimized or even substantially prevented. Obviously if browning of the bottoms of the rolls is desired the pan may be entirely omitted and the baking be done on the false bottom alone.

In using the annular cutters for cutting doughnuts, the dough is rolled out on the board about one-half to three-quarters of an inch thick. The cutter is inverted and placed on the dough thus spread out on the board and the board, dough and cutter are then inverted and the board may be pressed down to effect the cutting. Preferably however the board is removed and a sheet of heavy cloth, as canvas, is placed over the dough and the dough is rolled into the cutter. After such rolling the cutter is raised, the doughnuts cut out being retained in the cups. Since the dough shrinks after cutting, those portions of the dough which are within the smaller cylindrical cutters and those which are exterior to the larger cylindrical cutters shrink away from the cutters and on such raising drop through the open bottoms and may be gathered up to be again reincorporated in a batch and rolled out. A tray or other receptacle is inverted over the cutters and the whole reinverted and the doughnuts cut out are allowed to drop into the tray, after which they are ordinarily set aside and allowed to rise before being dropped into the frying fat usually used in their cooking.

It will readily be understood that the dough may be made into a flat sheet preparatory to cutting other than by rolling out on a board and that the method of forming the sheet is not to be confined to the roller and board method. For instance, it may be possible to pass the dough between a pair of rollers which will flatten it into a sheet and to place this sheet directly on top of the cutters as by moving the cutters along beneath the cutters as the dough is extruded, or by traversing the rollers along the cutters, it being necessary only to accomplish the forming and placing of the sheet of dough on the cutter. Obviously if this is done the inversion after bringing the cutters and dough into contact becomes unnecessary.

It will also be understood that the annular cutter may be used for the preparation of dough other than for doughnuts.

I claim:

1. A baking method which includes rolling out a layer of dough of substantially uniform and desired thickness, placing successively thereon a group of cutters and an inverted baking pan, inverting the assembly thus formed and exerting pressure on said dough to separate same into units of cutter shape and force said units through said cutters and into baking position, removing said cutter and superposed instrumentalities, allowing said dough to rise, and subsequently baking it.

2. The method of preparing and baking rolls which includes forming a sheet of dough of uniform and suitable thickness, placing said sheet over a baking device, trimming and separating said sheet into abutting elongated rectangular units and allowing said units to drop, individually supporting the units so deposited, each respectively with its center portion upwardly arched along its longitudinal center line, to laterally separate said units, allowing said dough to rise while so supported and subsequently baking the rolls while so supported.

CLYDE E. STAINBROOK.